(12) United States Patent
Farkas et al.

(10) Patent No.: US 8,411,688 B2
(45) Date of Patent: Apr. 2, 2013

(54) METHOD AND APPARATUS FOR ETHERNET PROTECTION WITH LOCAL RE-ROUTING

(75) Inventors: János Farkas, Kecskemét (HU); Csaba Antal, Kiskunlacháza (HU); Attila Takács, Budapest (HU)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 165 days.

(21) Appl. No.: 12/933,200

(22) PCT Filed: Mar. 16, 2009

(86) PCT No.: PCT/EP2009/053047
§ 371 (c)(1),
(2), (4) Date: Sep. 17, 2010

(87) PCT Pub. No.: WO2009/115480
PCT Pub. Date: Sep. 24, 2009

(65) Prior Publication Data
US 2011/0013640 A1    Jan. 20, 2011

(30) Foreign Application Priority Data
Mar. 17, 2008 (GB) .................................. 0804920.7

(51) Int. Cl.
*H04L 12/28* (2006.01)
(52) U.S. Cl. .................. 370/395.53; 370/225; 370/389; 370/466; 709/223; 709/239
(58) Field of Classification Search .............. 219/121.39, 219/121.45, 121.44, 121.46, 121.48, 121.58, 219/60 R, 59.1, 61.3, 69.1; 82/83, 84; 370/216–218, 370/223, 225, 228, 242, 244, 338, 349, 392, 370/395.1, 395.5, 395.53, 466; 709/217, 709/229, 239
See application file for complete search history.

(56) References Cited

U.S. PATENT DOCUMENTS
2,842,238 A  *  7/1958  Shaw et al. ................... 409/179
(Continued)

OTHER PUBLICATIONS
Allen et al. "Provider Backbone Transport Overview" Version 1.0 Dec. 2007.*
(Continued)

*Primary Examiner* — Wing F Chan
*Assistant Examiner* — Rajeshwari Krishnan
(74) *Attorney, Agent, or Firm* — Roger S. Burleigh

(57) ABSTRACT

A method is provided for use at a first node of a network. The first node (B) has an input path for receiving Ethernet frames destined for a second node of the network. The first node (B) also has a first output (working) path for forwarding the received Ethernet frames towards the second node. A failure along the first output (working) path is detected at the first node. Following such failure detection, the received Ethernet frames are caused, at the first node, to be re-routed along a second output (backup) path, different to the first output (working) path, towards the second node. The re-routing is performed by using (e.g. referring to and/or changing) respective indications (VLAN1) applied to the Ethernet frames to distinguish those Ethernet frames to be forwarded along the first output (working) path from those Ethernet frames to be forwarded along the second output (backup) path.

16 Claims, 15 Drawing Sheets

U.S. PATENT DOCUMENTS

| | | | |
|---|---|---|---|
| 3,820,424 A * | 6/1974 | George, Jr. | 82/101 |
| 4,260,869 A * | 4/1981 | Slavens et al. | 219/124.31 |
| 4,625,464 A * | 12/1986 | Kubo | 451/441 |
| 6,975,627 B1 * | 12/2005 | Parry et al. | 370/389 |
| 7,093,027 B1 * | 8/2006 | Shabtay et al. | 709/239 |
| 7,257,895 B2 * | 8/2007 | Makkonen et al. | 30/96 |
| 8,061,249 B1 * | 11/2011 | Kaehr et al. | 83/456 |
| 2006/0164975 A1 | 7/2006 | Filsfils et al. | |
| 2007/0011284 A1 * | 1/2007 | Le Roux et al. | 709/223 |
| 2007/0116045 A1 * | 5/2007 | Mohan et al. | 370/466 |

OTHER PUBLICATIONS

Chiruvolu et al, "Issues and Approaches on Extending Ethernet Beyond LANs" in IEEE Communications Magazine, Mar. 2004.*

Glenn Parsons, "Ethernet Bridging Architecture" in IEEE Communications Magazine, Dec. 2007.*

"RFC 4090: Fast Reroute Extensions to RSVP-TE for LSP Tunnels", May 2005, by Pan et al.*

802 1Qay Provider Backbone Bridges—Traffic Engineering, PBB-TE, Nov. 2007.

\* cited by examiner

METHOD AND APPARATUS FOR ETHERNET PROTECTION WITH LOCAL RE-ROUTING

TECHNICAL FIELD

The present invention relates to a method and apparatus for Ethernet re-routing.

BACKGROUND

Today Ethernet forwarding relies on the Rapid Spanning Tree Protocol (RSTP) and the Multiple Spanning Tree Protocol (MSTP), which control forwarding by controlling the active topology. MAC addresses are automatically learnt based on the frames sent on the active topology. RSTP and MSTP are also the main fault handling principles, as they dynamically reconfigure the active topology after a fault.

There is a standardization work going on in IEEE in order to provide a new type of control for Ethernet networks, which is called 802.1Qay Provider Backbone Bridges—Traffic Engineering (PBB-TE) [802.1Qay—Provider Backbone Bridge Traffic Engineering]. In PBB-TE, RSTP and MSTP are not used; instead the forwarding is controlled by the configuration of MAC addresses, i.e. the explicit setting up of forwarding paths towards the destination. That is, no dynamic MAC address learning is applied. The fault handling principle in PBB-TE is protection switching, i.e. switching to a backup path after the failure of a protected network element. Both the working and backup paths are configured in advance.

In this respect, the following issues have been identified by the present applicant.

The protection switching schemes discussed for PBB-TE Ethernet networks rely on switching between end-to-end paths. That is, a failure in the middle of the network has to be first detected by the edge nodes of the network.

The time needed to notify edge nodes may slow down the reaction to the failure (it may depend on the frequency of connectivity monitoring). More significantly, the end-to-end protection schemes require monitoring on a per-connection level. This may result in parallel monitoring of connections.

Mechanisms are known in relation to other packet technologies. For example, Multi Protocol Label Switching (MPLS) Fast Reroute (also called MPLS local restoration or MPLS local protection) is a local restoration network resiliency mechanism. Two methods are defined for MPLS. The one-to-one backup method creates detour Label Switched Paths (LSPs) for each protected LSP at each potential point of local repair. The facility backup method creates a bypass tunnel to protect a potential failure point; by taking advantage of MPLS label stacking, this bypass tunnel can protect a set of LSPs that have similar backup constraints. Both methods can be used to protect links and nodes during network failure.

In addition, IP fast-reroute mechanisms provide protection against link or router failure by invoking locally-determined repair paths. Unlike MPLS Fast Reroute, the mechanisms are applicable to a network employing conventional IP routing and forwarding. IP Fast ReRoute (IP-FRR) mechanisms are meant to provide alternative paths for a temporary time period until the network converges to a stable state with normal forwarding tables. In the interim period, microloops may occur and must be prevented. That is, the IP-FRR mechanisms activate alternate routing paths which avoid micro loops under node or link failures.

However, these alternative technologies differ from Ethernet and, therefore, neither IP nor MPLS FRR mechanisms can be directly applied to Ethernet to alleviate the need of end-to-end per connection monitoring and improve failover times.

It is desirable to address at least one of the above issues.

Methods and apparatus are also known from: [Pan et al. "Fast Reroute Extensions to RSVP-TE for LSP Tunnels" RFC-4090, May 2005] and [M. Shand and S. Bryant "IP Fast Reroute Framework"<draft-ieff-rtgwg-IP-FRR-framework-07.txt> June 2007].

SUMMARY

According to a first aspect of the present invention there is provided a method for use at a first node of a network. The first node has an input path for receiving Ethernet frames destined for a second node of the network. The first node also has a first output (working) path for forwarding the received Ethernet frames towards the second node. The method comprises detecting, at the first node, a failure along the first output (working) path. Following such failure detection, the received Ethernet frames are caused, at the first node, to be re-routed along a second output (backup) path, different to the first output (working) path, towards the second node. The re-routing is performed by using (e.g. referring to and/or changing) respective indications applied to the Ethernet frames to distinguish those Ethernet frames to be forwarded along the first output (working) path from those Ethernet frames to be forwarded along the second output (backup) path.

In one embodiment, at least part of a Virtual Local Area Network, VLAN, tag in the Ethernet frames is used to hold the respective indications. In this embodiment, it could be that fewer than the total number of bits of the VLAN tag is/are used to hold the respective indications. For example, it could be that just a single bit of the VLAN tag is used for this purpose. Alternatively, all bits of the VLAN tag could be used to hold the respective indications, with a predetermined set of tags being used to indicate that a frame is a working frame, or a backup frame.

In a particular embodiment, the first and second paths are associated with first and second different respective ports of the first node.

In this particular embodiment, the first and second ports could be associated with different respective indications, the frames being offered to the first and second ports and only forwarded by the port if there is a match (which may be an exact match, or a match according to some predetermined criteria) between the indication associated with the port and the indication applied to the offered frame.

One possibility is that the respective indications associated with the first and second ports are changed following the detection of the failure, thereby causing the frames to be re-routed from the first path to the second path.

Another possibility is that the indications applied to the frames offered to the first and second ports are changed following the detection of the failure, thereby causing the frames to be re-routed from the first path to the second path. With this possibility, the indications applied to the frames could be changed again, at the second port, to restore them to their previous values, before the frames are sent out from the first node.

Changing of the indications applied to the frames offered to the first and second ports could be effected by way of adding an outer header to the frames, the existing header becoming an inner header, and the outer header having an indication different to that in the inner header. The outer header could comprise a different source and/or destination address to the inner header.

In one embodiment, the frames are offered to the port by a relay of the first node.

The second output path can be determined in advance of the step of detecting a failure in the first output path.

In one embodiment, the first node is (or comprises) a bridge as specified in 802.1Qay Provider Backbone Bridges—Traffic Engineering, PBB-TE.

The first node can be considered to be a "re-routing node", and the second node a "remote node". The first output path can be considered to be a "working path" and the second output path a "backup path".

According to a second aspect of the present invention there is provided an apparatus for use at a first node of a network. The first node has an input path for receiving Ethernet frames destined for a second node of the network, and a first output (working) path for forwarding the received Ethernet frames towards the second node. The apparatus comprising means for detecting a failure along the first output path, and also means for re-routing the received Ethernet frames along a second output (backup) path, different to the first output (working) path, towards the second node. The re-routing is performed by using (e.g. referring to and/or changing) respective indications applied to the Ethernet frames to distinguish those Ethernet frames to be forwarded along the first output path from those Ethernet frames to be forwarded along the second path.

According to a third aspect of the present invention there is provided a program for controlling an apparatus to perform a method according to the first aspect of the present invention or which, when loaded into an apparatus, causes the apparatus to become an apparatus according to the second aspect of the present invention. The program may be carried on a carrier medium. The carrier medium may be a storage medium. The carrier medium may be a transmission medium.

According to a fourth aspect of the present invention there is provided an apparatus programmed by a program according to the third aspect of the present invention.

According to a fifth aspect of the present invention there is provided a storage medium containing a program according to the third aspect of the present invention.

An embodiment of the present invention provides a method for fast failure handling in PBB-TE Ethernet networks. An embodiment of the present invention is fast and relatively simple; it is based on a fast reaction to a failure by a bridge that is next to the failure and is able to detect it very fast. An embodiment of the present invention applies redirection (switching) to a backup path identified by a different Virtual Local Area Network (VLAN) ID by the detector bridge (the bridge detecting the failure). Furthermore, in an embodiment of the present invention both working and protection paths are configured in advance in the PBB-TE network, and thus dynamic reconfiguration is not needed, so the reaction to a failure can be very fast. An embodiment of the present invention is also capable of protecting both point-to-point and point-to-multipoint services. Standardization of PBB-TE is ongoing in IEEE and IETF thus an embodiment of the present invention may relate to these SDOs.

DETAILED DESCRIPTION

Figure 1:
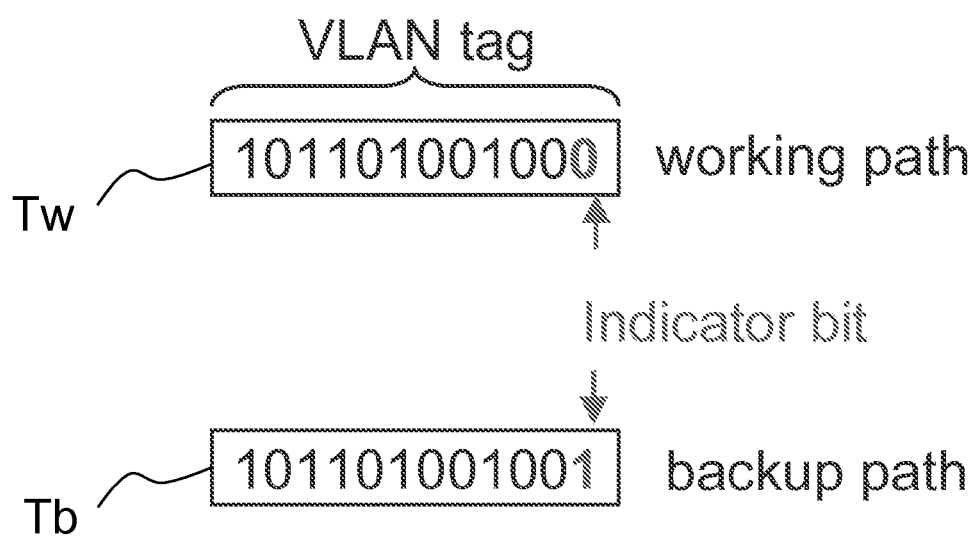
FIG. 1 illustrates a VLAN indicator bit.

As opposed to previous protection switching schemes for Ethernet networks, an embodiment of the present invention proposes local reaction to a failure at the place of the fault, thus making fast reaction possible. Four methods embodying the present invention are proposed for fast fault handling in Provider Backbone Bridges—Traffic Engineering (PBB-TE) Ethernet networks. These methods apply Fast Re-Route (FRR) to a backup path at the place of the failure, and thus they are referred to herein as Ethernet Fast Re-Route (ETH-FRR) methods; a reference to ETH-FRR should be interpreted as a reference to an embodiment of the present invention. As the redirection is done at the location of the fault, the reaction to the failure can be very fast. Affected traffic is redirected to a predefined backup, and thus on-the-fly calculation does not slow the reaction to the failure.

The first two of the four embodiments apply simple redirection to another path towards the destination; the other two of the four embodiments use tunnels to bypass the broken network element(s). All four embodiments are able to protect both point-to-point and point-to-multipoint services.

A goal with an embodiment of the present invention is to redirect those frames that should normally be sent towards the failure, and to perform this redirection at the detector of the failure (the node that detects the failure). That is, frames should be able to bypass the broken network element, and the bypassing is initiated by the bridge that detects the failure. There are four options to implement bypassing, which can be categorized according to two main principles:

1. Redirection within the detector bridge
   a. Redirection by the adjustment of VLAN member set
   b. Redirection by modifying the VLAN tag within the affected bridge
2. Use a bypass tunnel
   a. Backup VLAN bypass tunnel
   b. Fully encapsulated bypass tunnel These four embodiments are described more in detail below.

The focus in this description will be in the application of an embodiment of the present invention to Provider Backbone Bridges—Traffic Engineering (PBB-TE); that is, forwarding is configured and thus no automatic address learning is applied. Both working and backup forwarding paths are configured in advance. The calculation method of these paths is not important in relation to an embodiment of the present invention, and any appropriate method can be chosen from the literature.

All of the four embodiments have at least the following common features. Firstly, the fault is detected locally. This can be done in several manners, for instance with link level Connectivity Fault Management (CFM), or using another protocol or only relying on the signalling from the physical layer towards upper layers after loss of connection. Secondly, working and backup paths are distinguished somehow. Note that, in case of "Redirection within the detector bridge", the backup path is not visible externally, it is only distinguishable internally to the bridge initiating the reroute.

Options for utilizing the VLAN tag will now be described.

In ETH-FRR, the frames are redirected to a backup path after a failure in such a way that Ethernet forwarding principles are not modified. That is, frames travelling along the backup path are distinguished from frames going on the working path in order to invoke the necessary redirections. Therefore, VLAN tag is used for forwarding frames on the operational path, either on the working or on the backup path. In most proposed methods, except for 1a (see above), the working and backup paths are marked with different VLAN tags. Two basic approaches are proposed for the VLAN based differentiation:

A few VLAN tags are reserved for the backup paths. That is, the distinction is made on the whole VLAN tag, the entire VLAN tag may differ.

A few bits in the VLAN tag are reserved for the indication of backup path. For instance, only a single bit could indicate whether the frame is on the working or on the backup path, as is illustrated in FIG. 1. In FIG. 1, the VLAN tag Tw associated with the working path has the right-most (least significant) bit set to "0" while the VLAN tag Tb associated with the backup path has the right-most (least significant) bit set to "1". This way, the VLAN classification described in PCT patent application no. PCT/EP2007/062861 can be also applied.

The two VLAN tagging method differs from a scalability and applicability point of view. If one (or multiple) bit(s) is/are reserved as an indicator, then the VLAN ID space is divided into two parts: a group of the VLAN IDs can be used for working and corresponding to the working VLANs an other group is used for backup paths. This means a one-to-one correspondence between working and backup VLAN IDs as they only differ in specific bit(s). As opposed to this, if entire VLAN tags are reserved for backup paths then fewer VLAN IDs may be reserved for backup paths than the number of VLAN IDs used for working path. In this case, there is no one-to-one correspondence, and different VLANs cannot be distinguished after rerouting to the protection VLAN.

Option 1 described above (Redirection within the detector bridge; first and second embodiments) will now be described.

This is perhaps the simplest Fast Re-Route (FRR) approach for Ethernet when the frames are sent out on another port instead of the port connected to the broken element. This local action is not visible externally to the bridge.

Figure 2:
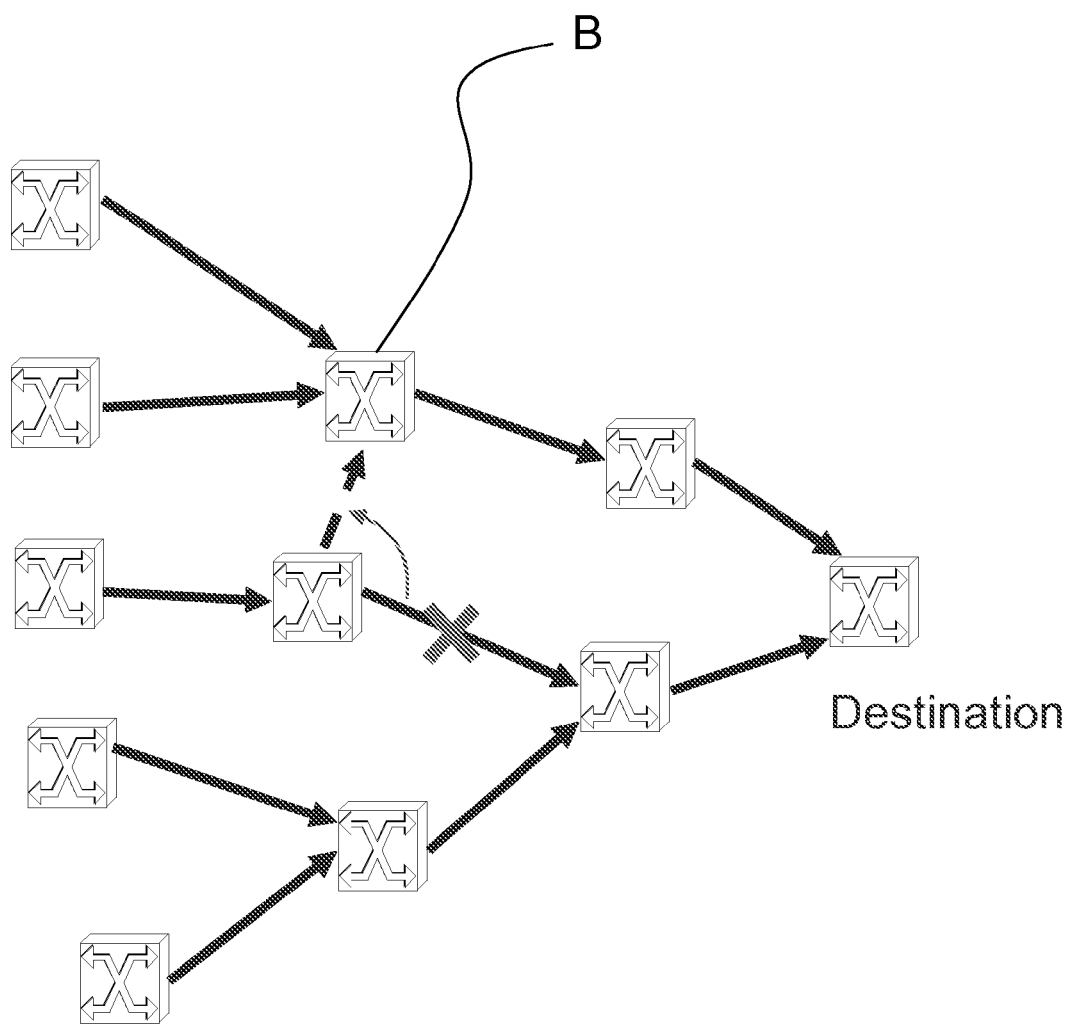
FIG. 2 illustrates a forwarding tree.

Reading out the Filtering Database (FDB) of the bridges in an Ethernet network a so-called forwarding tree can be drawn for each destination, which is illustrated in FIG. 2.

FIG. 2 shows a plurality of bridges B, with the root of the tree being the destination, reachable via several branches of the tree. In the FRR method the frame is simply redirected to another branch of the forwarding tree if a failure is detected. The very same frame (no changes to the header field) is then forwarded to the destination on another branch. The selection of the neighbour bridge B to which the frame is passed to can be important. One possibility is to select a neighbour bridge B that is closer to the destination than the bridge that redirects the frame like in IP-FRR approaches.

Two methods that implement the local redirection (see options 1a and 1b above) are described in detail below.

Option 1a described above (Redirection by the adjustment of VLAN member set; first embodiment) will now be described.

Local redirection at the location of the failure can be implemented by the adjustment of the member set of affected VLANs according to the detected failure. Ingress Filtering is enabled in this approach, i.e. frames arriving to a port on a VLAN is dropped if the port is not member of that VLAN. The basis of this approach is that incoming frames are always sent to multiple outgoing ports by the relay. Multiple copies of the frames are then filtered out by the egress filtering in all ports except for the port that is member of the corresponding VLAN, i.e. where the frame is aimed to be sent out. That is the outgoing direction of a frame is controlled by egress filtering. Therefore, the frames transmitted on a VLAN can be easily redirected from the working path to a backup path by the modification of the member set of a VLAN. That is, each VLAN has only a single port at a time where the frames belonging to that specific VLAN are sent out, which is either the working or the backup path depending on actual network conditions. Frames copied by the relay to all other ports are filtered out.

Figure 3:
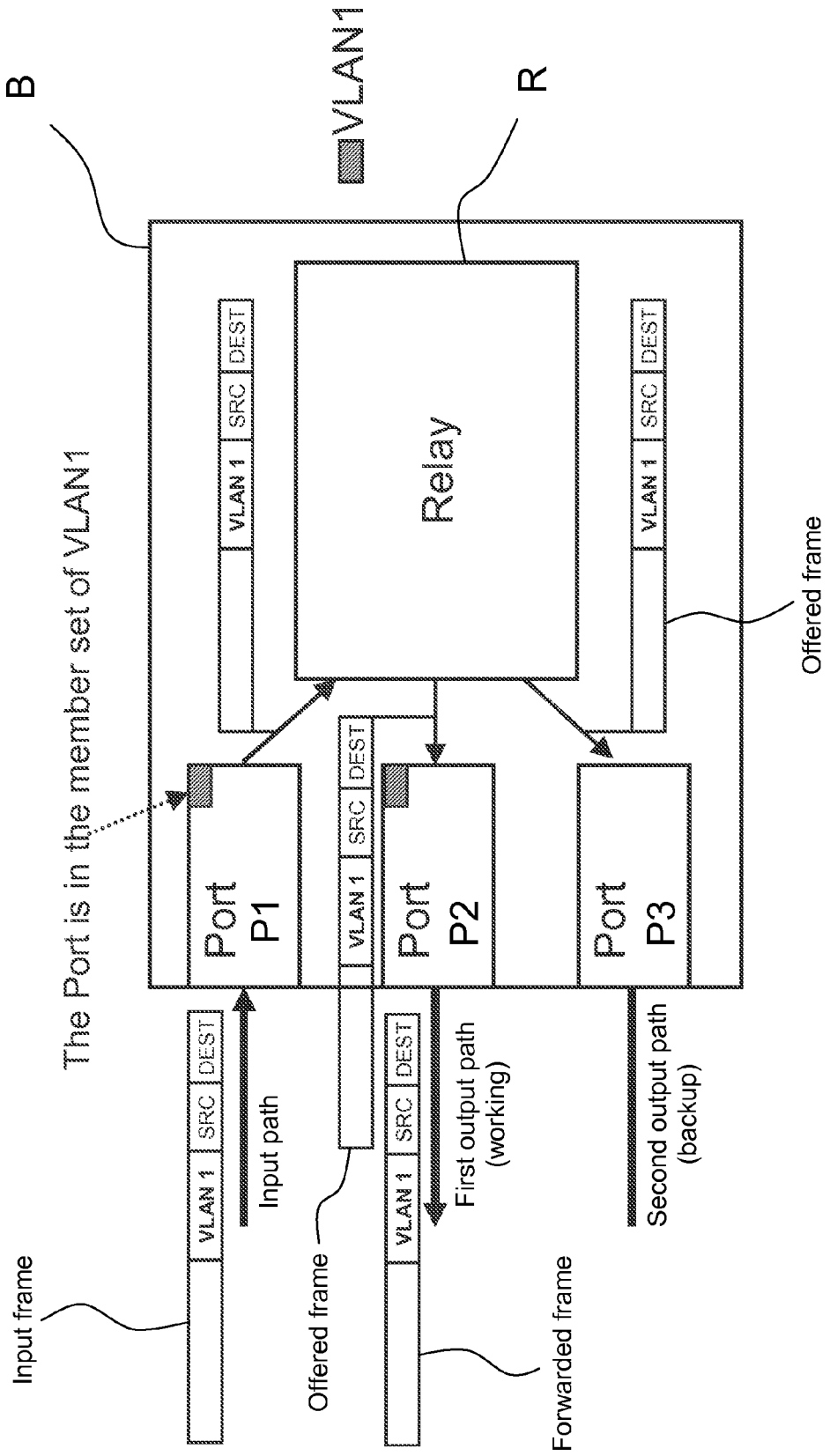
FIG. 3 illustrates filtering settings before a failure, i.e. a working path is used.

FIG. 3 shows the membership of ports P1, P2, and P3 in an example bridge B for a sample VLAN during normal operation. The hatched rectangles show if a port P is a member of VLAN1, i.e. can pass through the port filtering. That is, if there is a hatched rectangle at the upper-right corner of the port P in the figure then incoming frames belonging to VLAN1 can pass through the port P; and the frame copied to the port P passes through the egress filtering and sent out on the port P. In FIG. 3, frames arriving at Port P1 on VLAN1 are sent out on Port P2 and vice versa.

Figure 4:
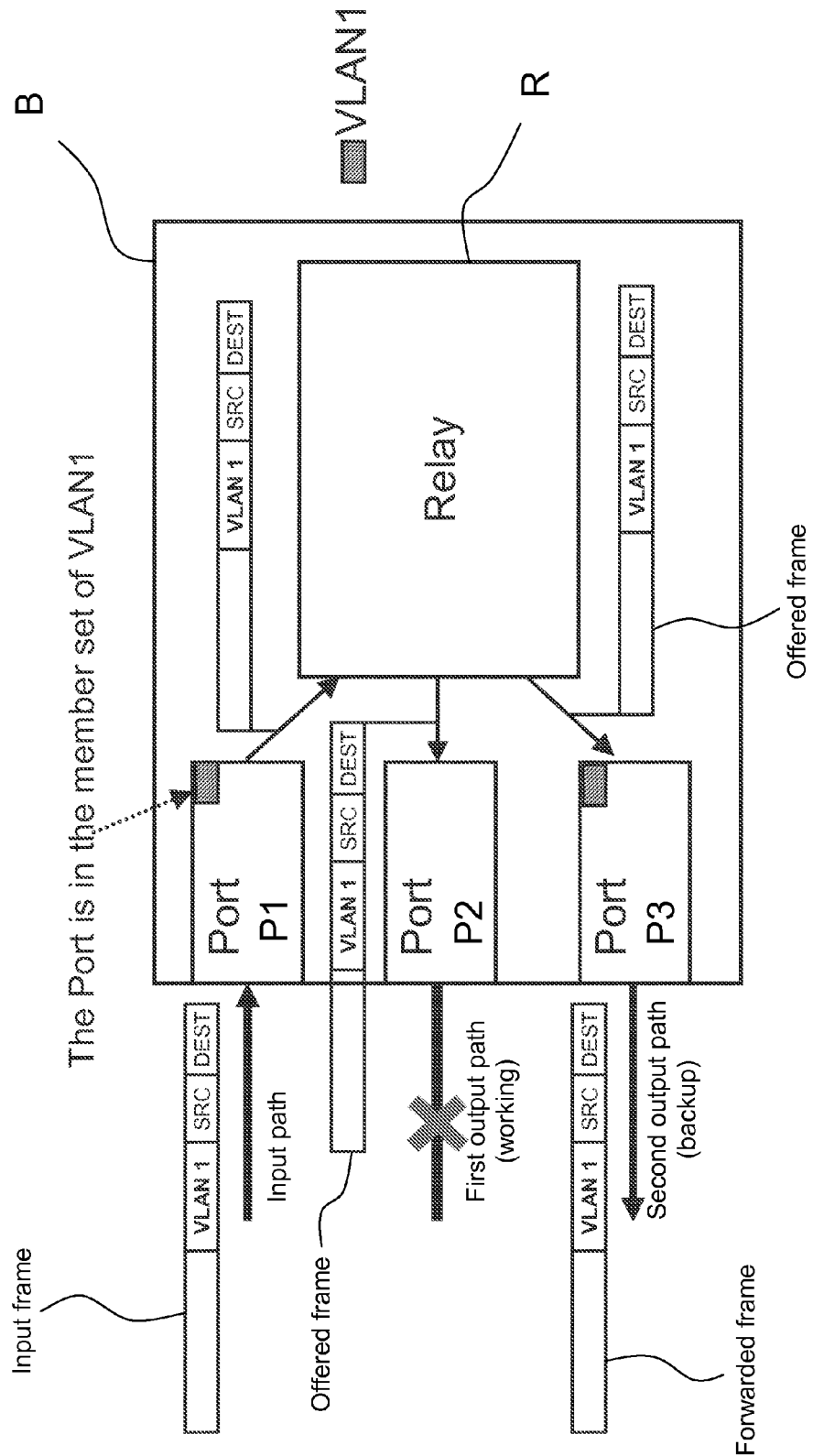
FIG. 4 illustrates filtering settings after a failure, i.e. a backup path is used.

FIG. 4 shows the case when the link connected to Port P2 goes down. Thus, traffic has to be redirected from the working path to the backup path. Therefore, the member set of VLAN1 has to be adjusted accordingly, i.e. Port P3 has to be included in order to allow frames belonging to VLAN1 to leave the bridge via Port P3.

Figure 5:
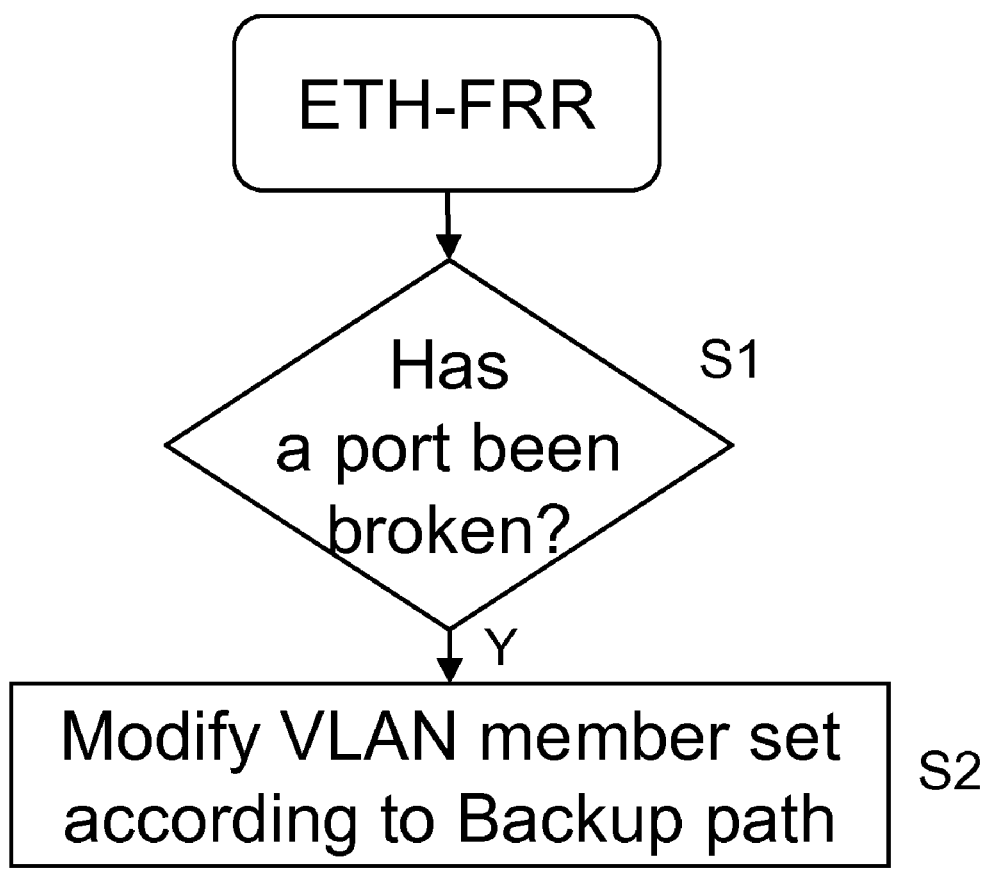
FIG. 5 illustrates operation of an Ethernet Fast Re-Route (ETH-FRR) method when egress filtering is used for redirection to a backup path.

FIG. 5 shows the operation of the ETH-FRR method that relies on the adjustment of the VLAN member set, which is implemented in module M. In step S2 it is determined whether a fault has occurred on the working path (causing output Port P2 to have a "broken" status), and if Yes then in step S3 the VLAN member set is modified so as to switch forwarding of frames on to the backup path.

The advantage of this method is that it is standard compliant, i.e. it can be applied in any bridge that supports 802.1Q. The proper adjustment depending on failure events has to be solved; which can be implemented e.g. in a management system.

Note that the method described above supports both 802.1Qay PBB-TE networks and 802.1Q networks, In 802.1Q networks, where the MAC learning is in the data plane, however, only point-to-point services can be protected this way, which are identified by the VLAN ID since the destination MAC address is not taken into account during frame forwarding. That is VLAN tunnels are protected. This puts a limitation on the number of connections/services that can be transmitted and protected because of the limited VLAN space due to the 12-bit VLAN ID.

This approach can be applied for protection of point-to-multipoint connections/services in a PBB-TE network, where the MAC learning is in control plane, i.e. static filtering entries are populated by the control protocol. Destination address is also taken into account during the selection of outgoing ports in case of a point-to-multipoint connection and the member set of all affected ports and VLANs has to be adjusted during the fast re-route after a failure.

In PBB-TE, the frame forwarding within a bridge is controlled by Static Filtering Entries, i.e. the 3-tuple of destination MAC address, VLAN ID, and outbound port. Therefore, frames can be redirected from working path to backup path by modifying any of the 3-tuple. That is, in case of a failure on a port, a very fast modification of the corresponding Static Filtering Entry or insertion of a new entry corresponding to the port on the backup path redirects traffic, i.e. invokes the fast re-route. The method described above modifies the VLAN ID but modification of any combination of the 3-tuple: destination MAC address, VLAN ID, and outbound port is a sub-case of this method.

Option 1b described above (Redirection by modifying the VLAN tag within the affected bridge; second embodiment) will now be described.

Another possibility for local redirection is to modify the VLAN tag in case of a failure before the frame is sent to the relay R, and thus the frame is directed towards the backup path. The VLAN tag has to be set back to the original one before the frame leaves the detector bridge in order to forward the frame towards the destination on another branch of the forwarding tree.

Figure 6:
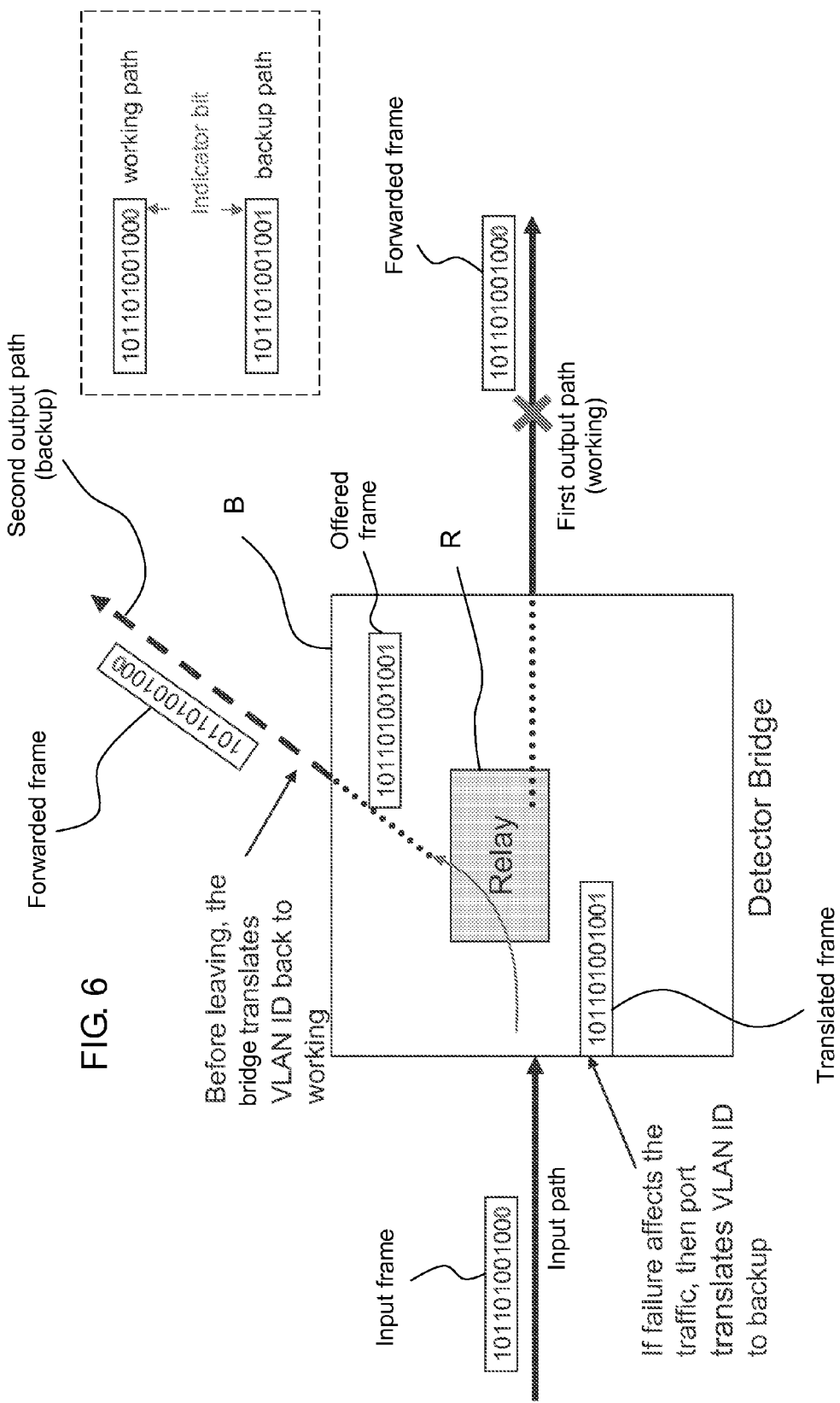
FIG. 6 illustrates redirection within a detector bridge by modifying a VLAN tag.

FIG. 6 shows how frames are redirected within the bridge B after a failure if the VLAN tag is modified only within the detector bridge.

The one bit VLAN tag differentiation between working and backup paths is applied, the indicator bit being the final bit in FIG. 6. The frame arrives on the working VLAN to the bridge B, i.e. the indicator flag is 0. As the outgoing port towards the destination is broken, the indicator bit is turned to 1, i.e. the VLAN tag is translated to the backup thus frame is redirected to the backup VLAN, before the frame is sent to the relay R. The forwarding is also configured for the backup VLAN in advance, thus the frame is sent to another port by the relay R. The VLAN ID is translated back to the working VLAN before the frame is sent out from the bridge B.

Figure 7:
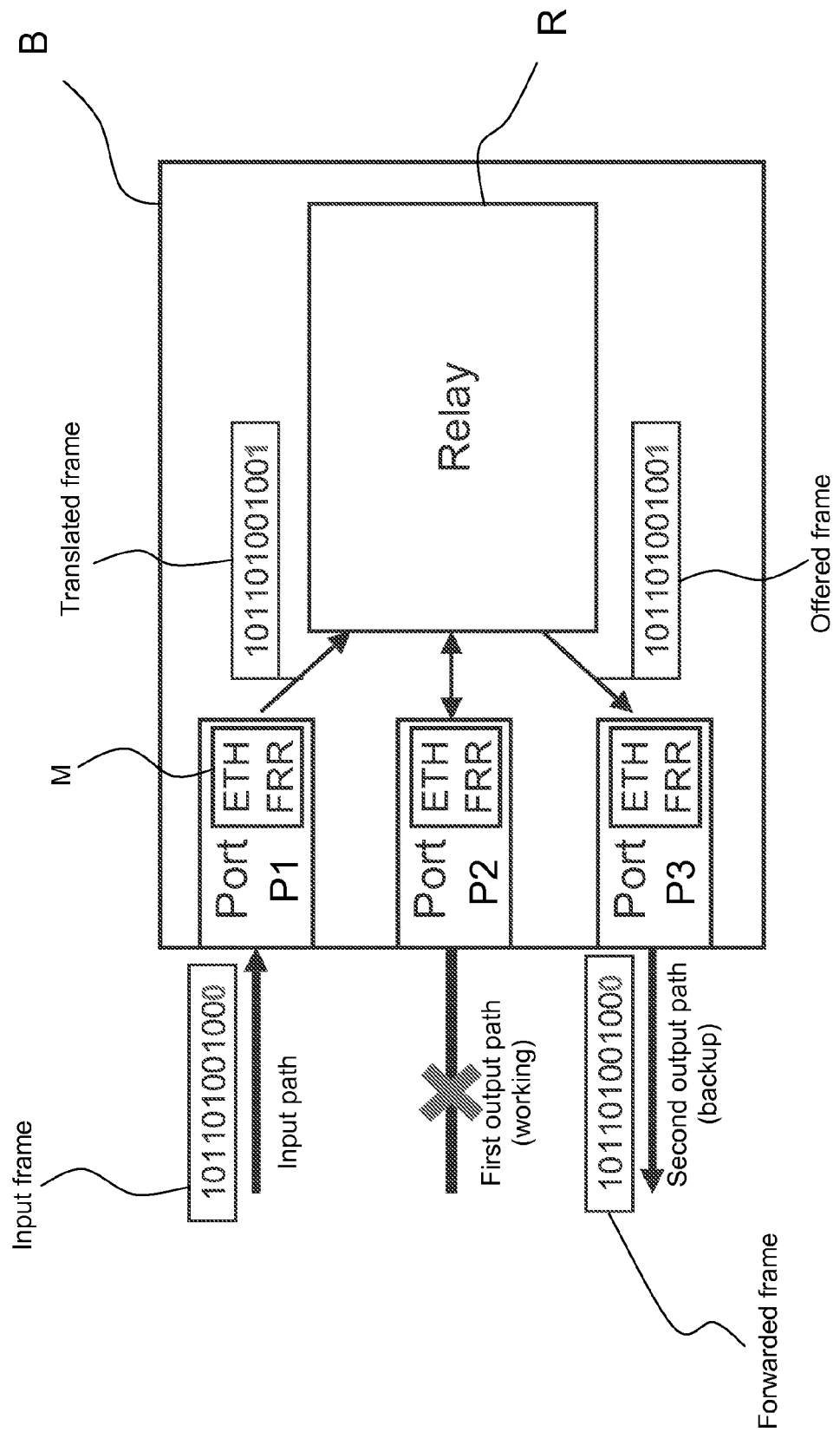
FIG. 7 illustrates Ethernet Fast Re-Route when frame is redirected within the detector bridge by modifying a VLAN tag.

FIG. 7 shows that the Ethernet Fast Re-Route functionality is implemented on each port of the bridge, in ETH-FRR module M.

Figure 8:
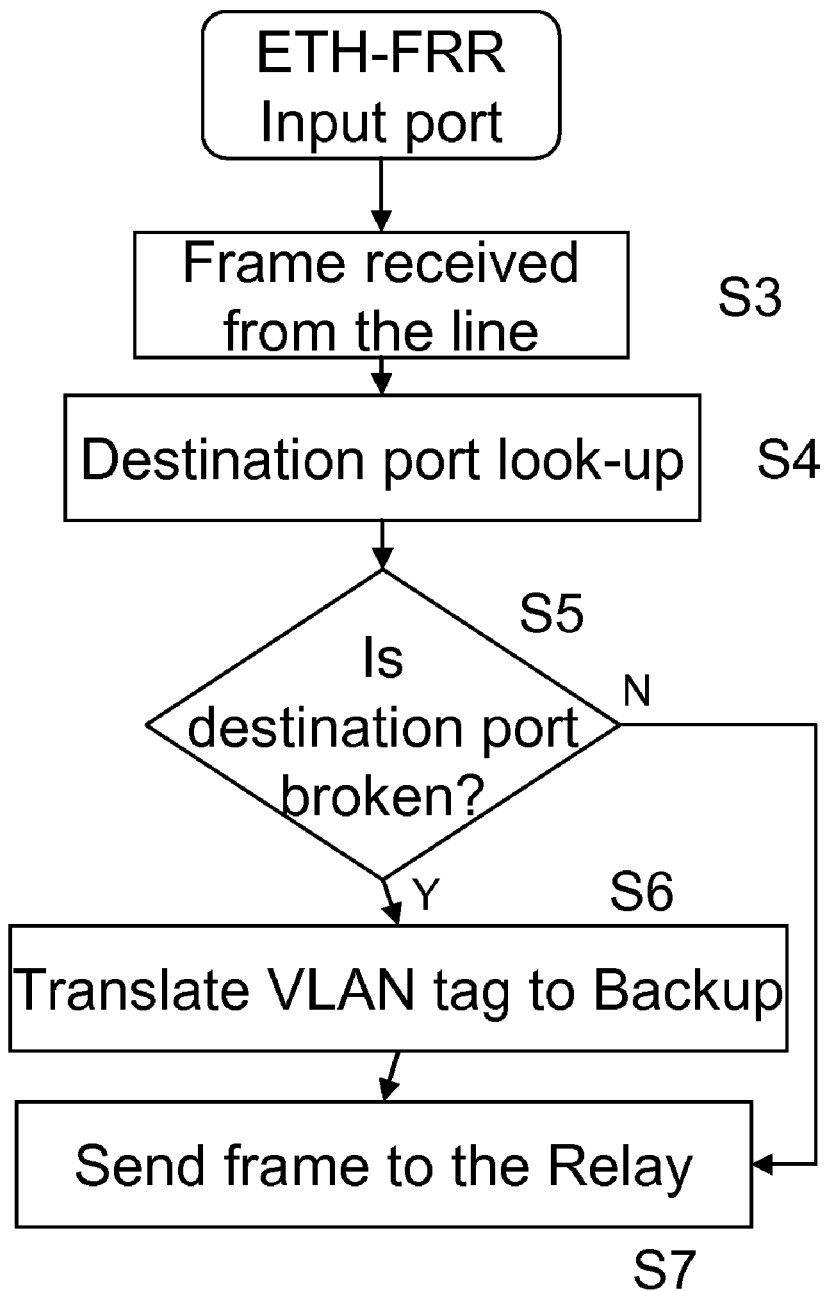
FIG. 8 illustrates operation of ETH-FRR at the input port when frames are redirected within a detector bridge by modifying a VLAN tag.
Figure 9:
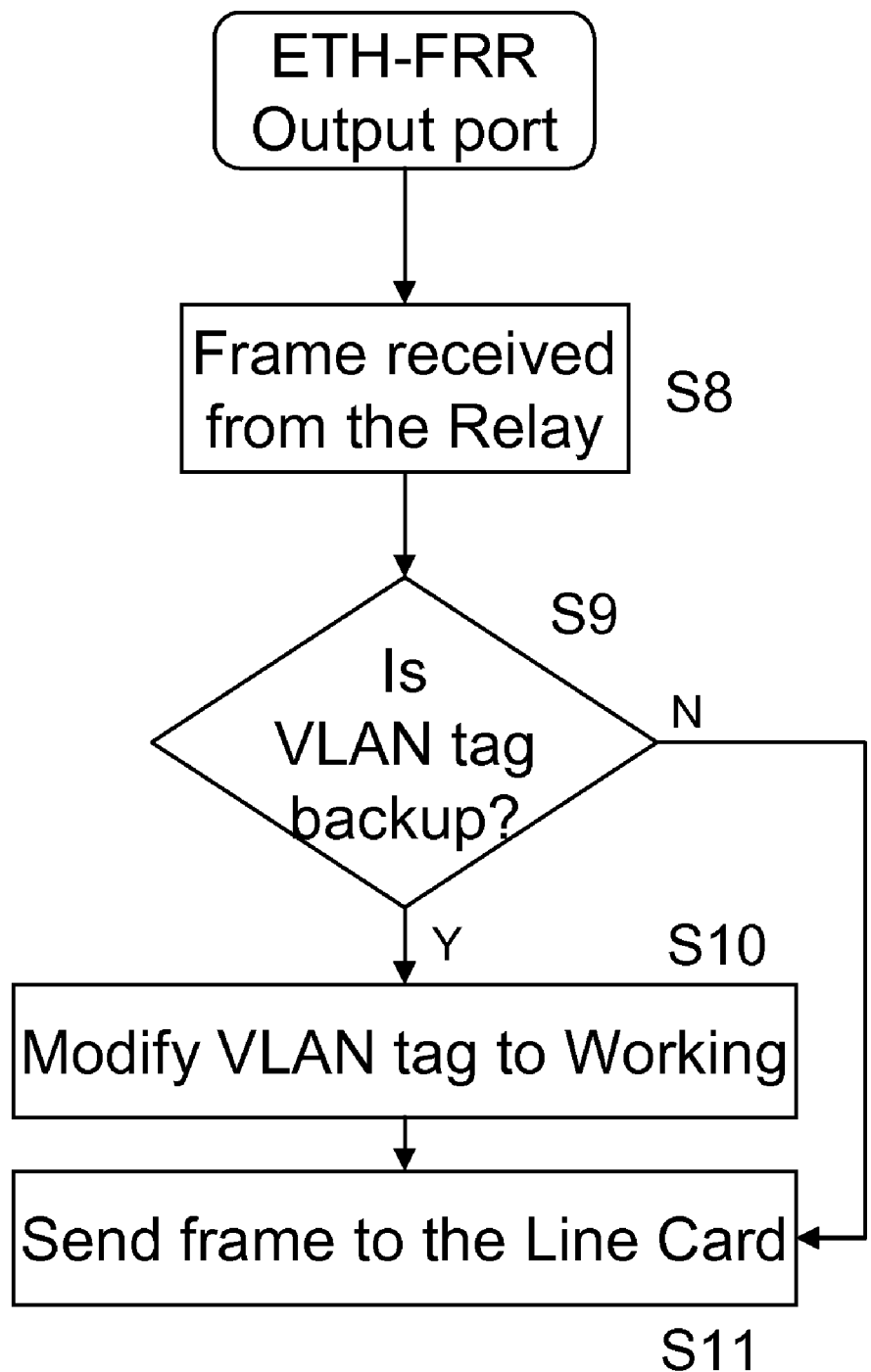
FIG. 9 illustrates operation of ETH-FRR at an output port when frames are redirected within a detector bridge by modifying a VLAN tag.

The frames are modified by the FRR at the ingress port before sent to the relay R. FRR at the egress port also modifies the frame after reception from the relay R and before it is sent out by the port. Redirected frames are only tagged by the VLAN ID of the backup path within the bridge B, i.e. only from the ingress port to the egress port as shown in the figure. FIG. 8 and FIG. 9 show the operation of ETH-FRR for the input and output ports, respectively.

For the ETH-FRR module M of the input Port P1, in step S3 a frame is received from the input path (or line). In step S4 a destination port lookup is performed. In step S5 it is determined whether a fault has occurred on the working path (causing output Port P2 to have a "broken" status), and if Yes then in step S6 the VLAN tag (indication) applied to the frame received in step S3 is translated so as to match that associated with the backup Port P3. In step S7, the translated frame is sent to the Relay R. If No in step S5, then processing passes directly to step S7, without translation.

For the ETH-FRR module M of the output Ports P2 and P3, in step S8 the frame is received from the Relay R (whether translated or not), and in step S9 it is determined whether the applied VLAN tag (indication) is a backup indication or not. If Yes, then in step S10 the VLAN tag (indication) is modified back to what it was before modification in step S6 above. In step S11 the frame is forwarded onto the output path (or line). If No in step S9, then processing passes directly to step S11, without the need to modify the VLAN tag (indication) applied to the frame, since no previous modification of the VLAN tag will have taken place by the input port P1.

The ETH-FRR method of the input port requires new tables, which are illustrated in Table 1 and Table 2. Table 1 helps to find out on which port the frame should be sent out. Based on Table 2 it can be then decided whether the outgoing port is broken or not before the frame is sent to the relay R. Note that these tables are only for the ETH-FRR functionality. They are independent of the frame forwarding invoked in the relay R, which only requires the normal single look-up. If the outgoing port is broken, then the VLAN translation is invoked before the frame is sent to the relay R.

TABLE 1

| Forwarding information | |
|---|---|
| Destination + VLAN | Port ID |
| B + 101101001000 | 02 |
| C + 101101001000 | 02 |
| B + 101000000000 | 02 |
| C + 101000000000 | 02 |
| D + 101101001000 | 03 |
| E + 101101001000 | 03 |
| D + 101000000000 | 03 |
| E + 101000000000 | 03 |

TABLE 2

| List of broken ports | | | |
|---|---|---|---|
| Port ID | 01 | 02 | 03 |
| Broken? | NO | YES | NO |

At the output port, frames coming out from relay R are checked whether they VLAN tag belongs to the backup path as shown in FIG. 9. If yes, then the frames' VLAN tag is translated back to the working path.

The indicator bit VLAN tag differentiation approach is the most expedient in this approach as VLAN tags can be easily managed by the masking method described in PCT patent application no. PCT/EP2007/062861. Frames are not sent between bridges with a backup VLAN ID, the backup indicator is only set within the bridge. The differentiation based on the entire VLAN tag would be more complex, a one-to-one correspondence needs to be defined between working and backup VLANs, which should be stored in a VLAN translation table in each bridge. A VLAN ID look-up would be then needed for each VLAN tag modification both on the input and on the output port.

This approach proposes add-ons to the ports of bridges but all the rest of the bridge architecture is standard without any modifications.

Option 2 described above (Bypass tunnels; third and fourth embodiments) will now be described.

The other FRR possibility in principle is to establish a bypass tunnel around the failure. Basically, there are two possibilities (see options 2a and 2b above) to implement a bypass tunnel in Ethernet, which are described in detail below.

Option 2a described above (Backup VLAN bypass tunnel; third embodiment) will now be described.

Figure 10:
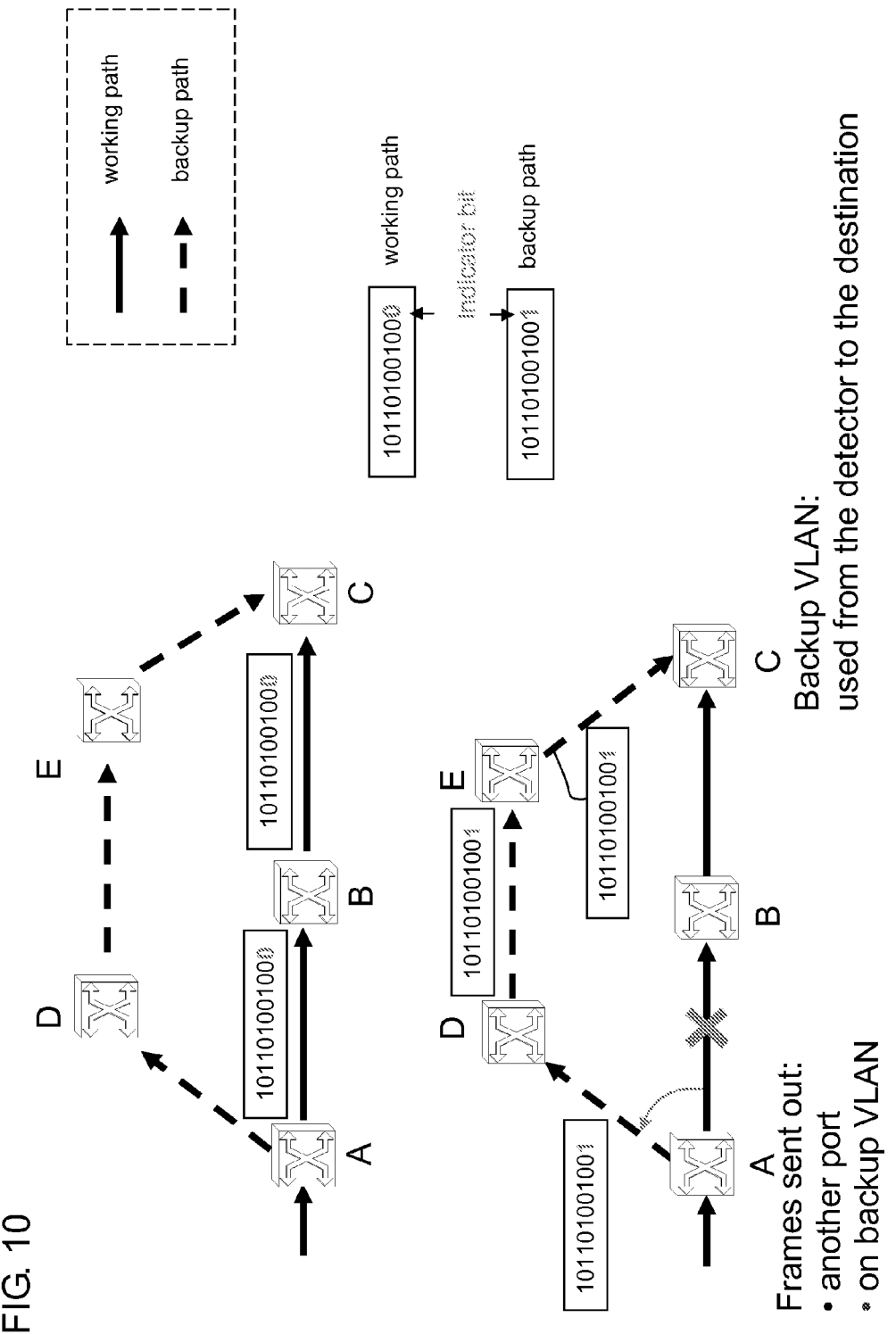
FIG. 10 illustrates ETH-FRR using a VLAN bypass tunnel.

Ethernet Fast Re-Route can be also implemented by replacing the VLAN tag and thus sending out the frame on another port to the destination. This way the frame bypasses the fault in a so-called VLAN tunnel. The method is illustrated in FIG. 10.

The figure shows the VLAN tagging approach where one bit indicates whether the frame travels on the working or on the backup VLAN. If a frame should be sent out towards a broken element at a bridge then the entire VLAN tag is replaced or a part of the VLAN, the indicator bit, is changed (as shown in the example), and sent out accordingly on another port. The forwarding for the backup VLAN is also configured in advance and the backup path is disjoint to the working path. The destination address is not modified in the frame only the VLAN tag is adjusted. Thus the frame is redirected into a tunnel that is established between the detector bridge and the destination.

Note that the same backup VLAN ID can be used for multiple backup paths.

Figure 11:
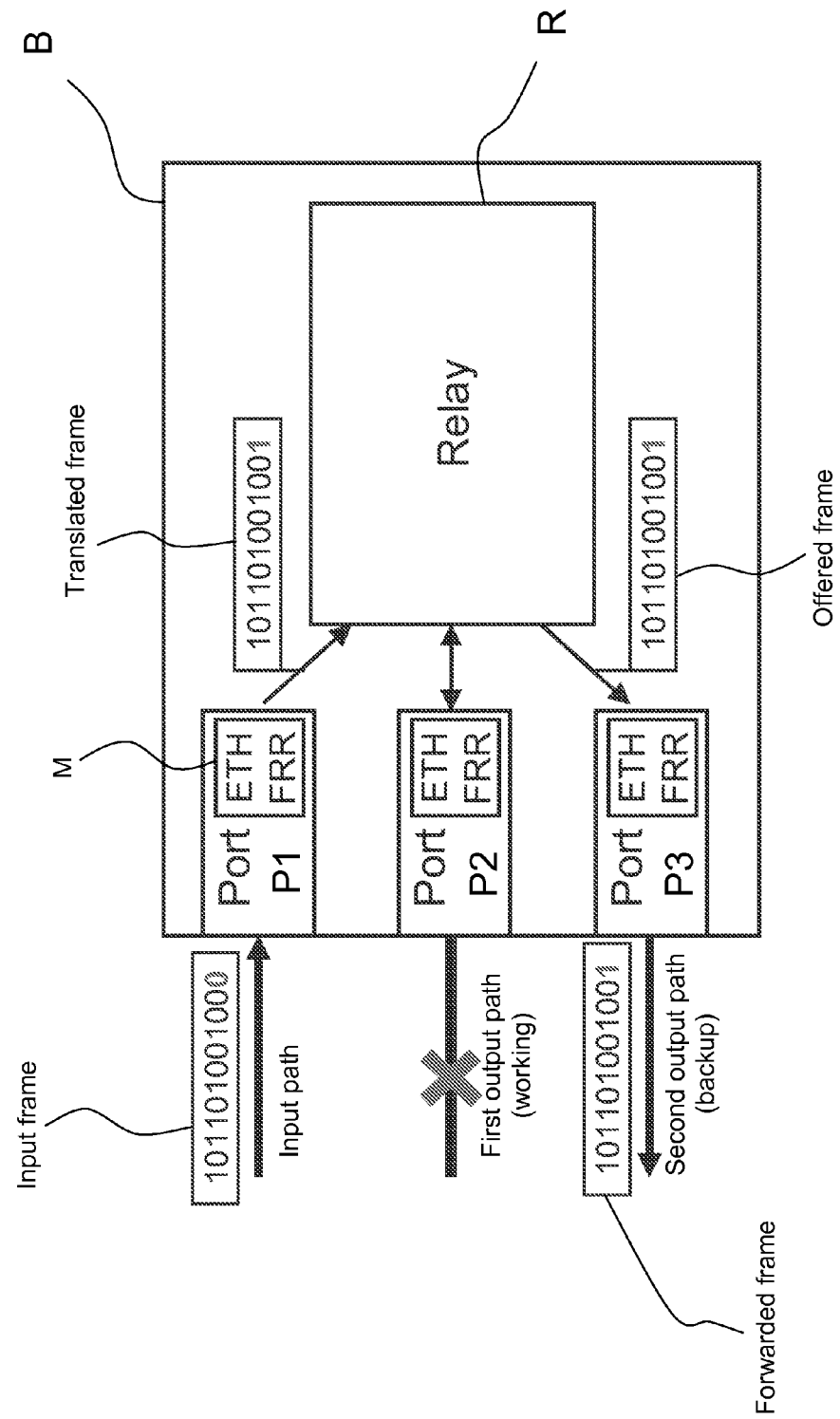
FIG. 11 illustrates redirection to a VLAN bypass tunnel.

FIG. 11 shows the redirection mechanism within the detector bridge.

Figure 12:
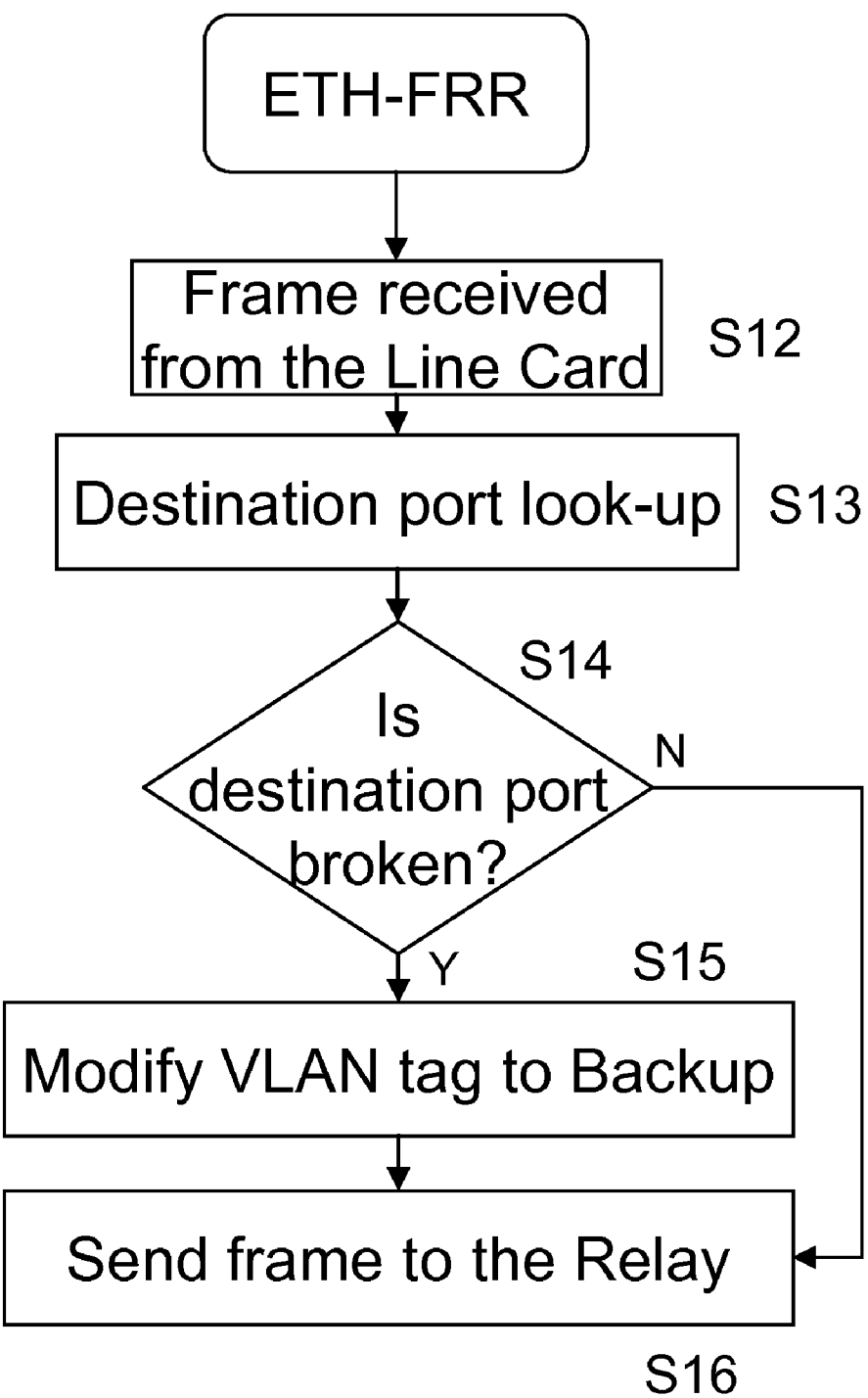
FIG. 12 illustrates operation of ETH-FRR when frames are redirected to a VLAN bypass tunnel by a detector bridge.

As the figure shows the ETH-FRR is part of each port. The flowchart of the method is shown in FIG. 12.

After the reception of the frame (step S12) the destination port is looked up (step S13) in a new table used in this ETH-FRR approach (illustrated in Table 3) and it is checked (step S14) whether the port is broken or not based another new table implemented for ETH-FRR (illustrated in Table 4). If the outgoing port is broken then the frame is to be redirected, i.e. the VLAN tag is to be modified. In the example, the indicator bit is set (step S15) thus the frame is redirected to the backup VLAN. The frame with the modified VLAN tag is then sent to the relay R (step S16). The relay R then forwards the frame towards the backup path based on the traditional forwarding mechanism using a single FDB look-up. Note that ETH-FRR has no action to do in the outgoing port as the frame is transmitted with the new VLAN tag on the whole backup path.

TABLE 3

Forwarding information

| Destination + VLAN | Port ID |
| --- | --- |
| B + 101101001000 | 02 |
| C + 101101001000 | 02 |
| B + 101000000000 | 02 |
| C + 101000000000 | 02 |
| D + 101101001000 | 03 |
| E + 101101001000 | 03 |
| D + 101000000000 | 03 |
| E + 101000000000 | 03 |

TABLE 4

List of broken ports

| Port ID | 01 | 02 | 03 |
| --- | --- | --- | --- |
| Broken? | NO | YES | NO |

Note that if not dedicated bits indicate whether a VLAN ID belongs to a backup path or not but the entire VLAN tag is used to make distinction then a VLAN translation table has to be implemented too. The VLAN translation table is illustrated in Table 5. Note that the same backup VLAN ID may belong to multiple working VLAN IDs.

TABLE 5

VLAN translation table

| Working VLAN | Backup VLAN |
| --- | --- |
| 101101001000 | 00000000011 |
| 101000000000 | 111111111000 |
| 001111111111 | 111111111000 |

This ETH-FRR method requires the implementation of new functionalities to bridge ports but the rest of the bridge is untouched and compliant to the standards.

Option 2b described above (Fully encapsulated bypass tunnel; fourth embodiment) will now be described.

Figure 13:
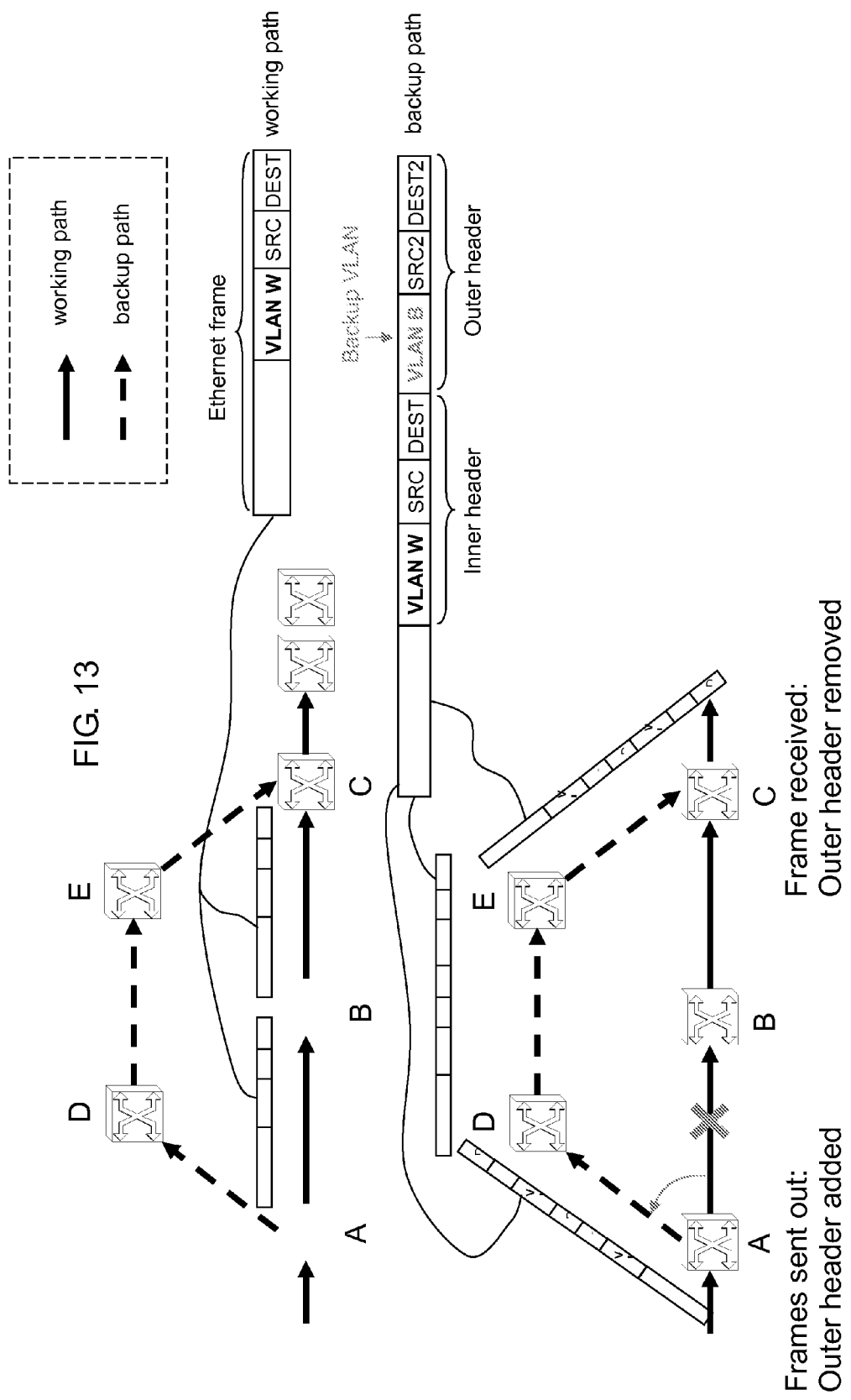
FIG. 13 illustrates a fully encapsulated bypass tunnel.

In this ETH-FRR approach fully encapsulated bypass tunnel is applied, that is a full outer header is added to the redirected frame. Therefore, the destination address in the outer header may differ from the destination in the inner header. Thus the tunnel starts from the detector bridge but may have different ends. It can be an end-to-end tunnel, i.e. the destination in the outer header is the same as the original (i.e. the final) destination; or it can be a bypass tunnel, i.e. the destination in outer header of the frame Ii different: it is another bridge on the way to the final destination. The outer header is removed at its destination thus the destination bridge has to be aware that the frame arrived on a backup path. Therefore, VLAN tag based differentiation is applied in this approach too. The tunnel is illustrated in FIG. 13. The tunnels bypassing protected network elements are designed in advance and the forwarding is configured accordingly As shown in FIG. 13, the outer header is added at bridge A after the detection of the failure. Thus the frame is sent to the tunnel of which end is bridge C, which removes the outer header before processing the frame if it is the destination and the frame is tagged with a backup VLAN. The frame is then either forwarded on the working path if it has another destination or sent to the upper layer if its destination is bridge C in the inner header too. Note that any level of header stacking can be implemented this way.

Figure 14:
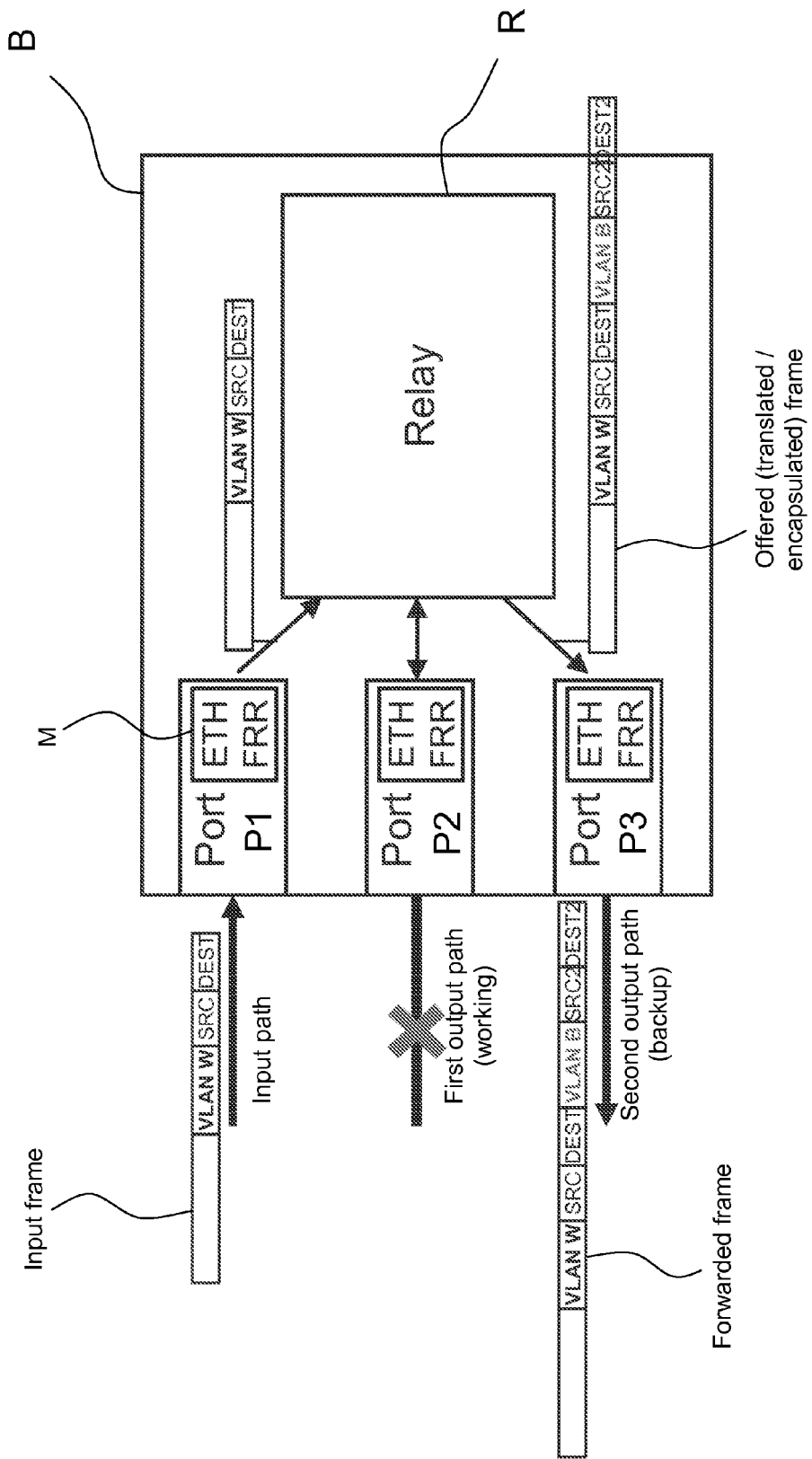
FIG. 14 illustrates redirection to a fully encapsulated bypass tunnel.

FIG. 14 shows the redirection to the fully encapsulated tunnel within the bridge.

Figure 15:
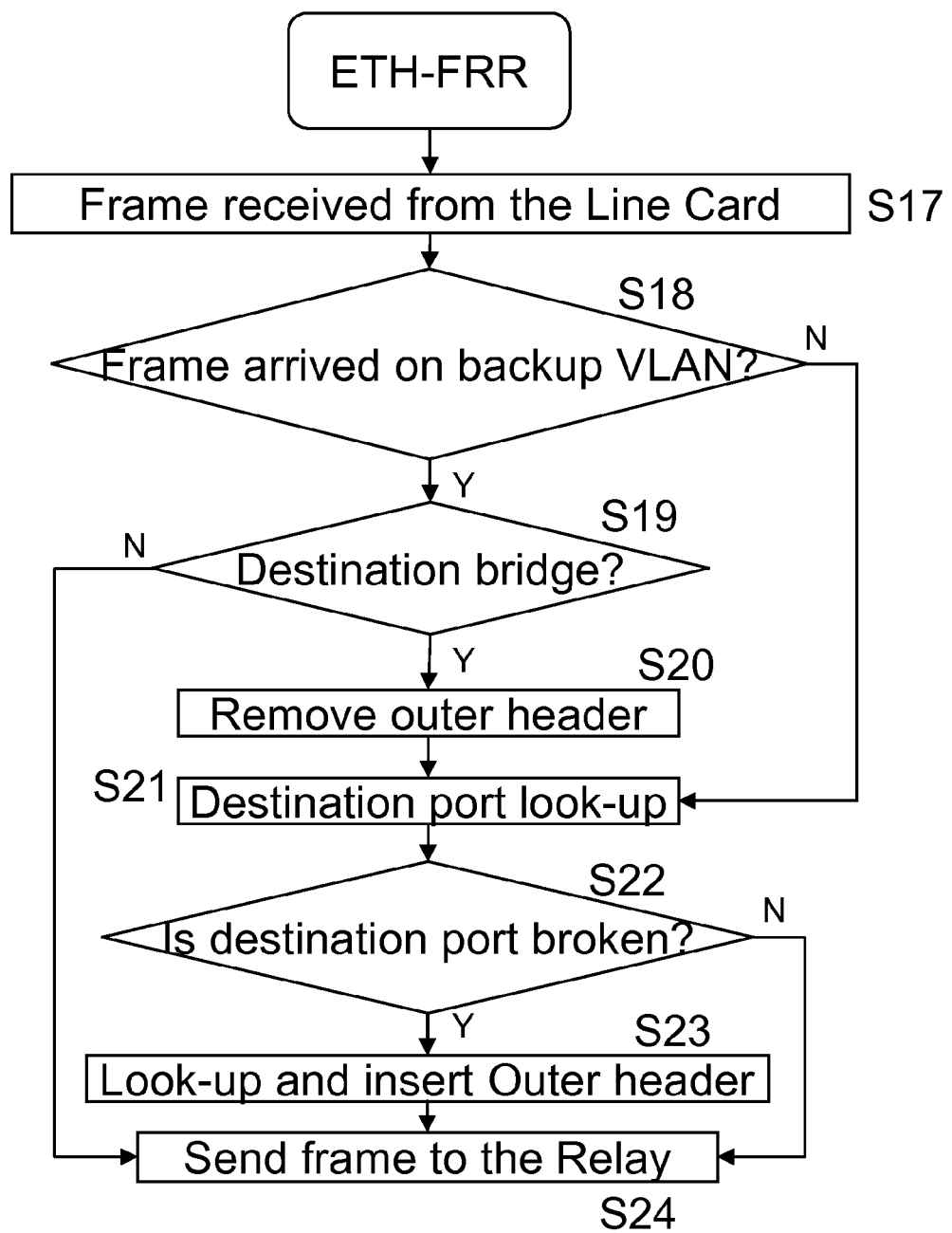
FIG. 15 illustrates operation of ETH-FRR when frames are redirected to a fully encapsulated bypass tunnel by a detector bridge.

The operation of the ETH-FRR entity is shown in FIG. 15. If a frame arrives to a port (step S17) then it is checked (step S18) whether the frame arrived on a backup VLAN. If so and this bridge is the destination (checked in step S19) then the outer header has to be removed (step S20). This ETH-FRR method uses new tables implemented for maintaining information on which port (checked in step S21) is the outgoing port (illustrated in Table 6) and checking (step S22) whether the outgoing port is operational (illustrated in Table 7). If not then an outer header has to be added to the frame, which is also retrieved from Table 6 (step S23). The frame is then sent to the relay R (step S24), which forwards the frame based on the outer header. Note that the relay R is not modified and makes a single look-up in order to make the forwarding decision.

Note that the outgoing port has no task in this ETH-FRR approach.

TABLE 6

Forwarding information

| Destination + VLAN | Port ID | Outer Header Dest. + VLAN |
| --- | --- | --- |
| B + 1011010010001 | 02 | B + 10111111111 |
| C + 101101001001 | 02 | C + 10111111111 |

TABLE 6-continued

Forwarding information

| Destination + VLAN | Port ID | Outer Header Dest. + VLAN |
|---|---|---|
| B + 101000000000 | 02 | B + 101111111111 |
| C + 101000000000 | 02 | C + 101111111111 |
| D + 101101001000 | 03 | D + 100000000001 |
| E + 101101001000 | 03 | E + 100000000001 |
| D + 101000000000 | 03 | D + 100000000001 |
| E + 101000000000 | 03 | E + 100000000001 |

TABLE 7

List of broken ports

| Port ID | 01 | 02 | 03 |
|---|---|---|---|
| Broken? | NO | YES | NO |

Both kind of differentiation can be applied in this method (however the entire VLAN tag approach is preferable), the entire VLAN tag based differentiation is used in the example. Thus the entire VLAN tag has to be observed in order to decide whether the frame arrived on a backup VLAN or not so a look-up is invoked in the list of backup VLANs, which is shown in Table 8 for the example. Note that one VLAN ID is used as backup for multiple working VLANs.

TABLE 8

List of backup VLANs

Backup VLANs 1011010010001
101000000000

This ETH-FRR approach also requires additional functionalities to the bridge ports as described above relating to option 2. However, the rest of the bridge architecture is standard without any modifications.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

The invention claimed is:

1. A method for use at a first node of a network, the first node receiving on an input path and an associated ingress port, Ethernet frames originated by a source node and destined for a second node of the network, and forwarding on a first output path and an associated first egress port, the received Ethernet frames towards the second node, the method comprising the steps of:
    locally detecting by the first node, a failure along the first output path at a point between the first and second nodes;
    re-routing by the first node, the received Ethernet frames along a second output path, different than the first output path, towards the second node, wherein the re-routing is visible only internally within the first node and the second output path is associated with a second egress port different than the first egress port, wherein the first and second egress ports are associated with different respective indications and the different respective indications are also applied to the Ethernet frames, the frames being offered to the first and second egress ports and only forwarded by a given one of the egress ports if there is a match between the indication associated with the given egress port and the indication applied to the offered frames, and wherein the frames are caused to be rerouted from the first path to the second path following the detection of the failure by changing the respective indications associated with the frames offered to the first and second egress ports; and
    at the second egress port, changing the indications applied to the frames again, to restore them to their previous values, before the frames are sent out from the first node;
    wherein the first and second output paths are not pre-provisioned in other network nodes, the second egress port is not the ingress port, and the first node does not send a message to the second node to notify the second node that the frames have been re-routed from the first path to the second path.

2. The method as claimed in claim 1, wherein at least part of a Virtual Local Area Network (VLAN) tag in the Ethernet frames is used to hold the respective indications.

3. The method as claimed in claim 2, wherein fewer than the total number of bits of the VLAN tag is/are used to hold the respective indications.

4. The method as claimed in claim 2, wherein all bits of the VLAN tag are used to hold the respective indications.

5. The method as claimed in claim 1, wherein the frames are offered to the first and second egress ports by a relay of the first node.

6. The method as claimed in claim 1, further comprising determining the second output path in advance of the step of detecting a failure in the first output path.

7. The method as claimed in claim 1, wherein the step of locally detecting a failure at a point along the first output path includes detecting the failure utilizing link level Connectivity Fault Management (CFM).

8. The method as claimed in claim 1, wherein the step of locally detecting a failure at a point along the first output path includes detecting the failure by detecting signaling from a physical protocol layer towards upper layers after a loss of connection.

9. An apparatus for use at a first node of a network, the first node having an ingress port associated with an input path for receiving Ethernet frames originated by a source node and destined for a second node of the network, and having first and second egress ports associated with respective first and second different output paths for forwarding the received Ethernet frames towards the second node, the first and second egress ports being associated with different respective indications and the different respective indications also being applied to the Ethernet frames, and the first node being adapted such that frames are offered to the first and second egress ports and only forwarded by a given one of the egress ports if there is a match between the indication associated with the given output port and the indication applied to the offered frames, wherein the apparatus is configured to:
    locally detect a failure along the first output path at a point between the first and second nodes;
    re-route the received Ethernet frames along the second output path towards the second node by changing the respective indications associated with the frames offered to the first and second egress ports; and at the second egress port, change the indications applied to the frames again, to restore them to their previous values, before the frames are sent out from the first node;

wherein the first and second output paths are not pre-provisioned in other network nodes, the second egress port is not the ingress port, and the first node does not send a message to the second node to notify the second node that the frames have been re-routed from the first path to the second path.

10. The apparatus as claimed in claim 9, wherein the apparatus is configured to locally detect a failure at a point along the first output path utilizing link level Connectivity Fault Management (CFM).

11. The apparatus as claimed in claim 9, wherein the apparatus is configured to locally detect a failure at a point along the first output path by detecting signaling from a physical protocol layer towards upper layers after a loss of connection.

12. A method for use at an intermediate node of a network, the intermediate node having an input path for receiving Ethernet frames originated by a source node and destined for a second node of the network, and a first output path for forwarding the received Ethernet frames towards the second node, the method comprising the steps of:
  locally detecting by the intermediate node, a failure along the first output path at a point between the intermediate node and the second node; and
  in response to locally detecting the failure, internally re-routing by the intermediate node, the received Ethernet frames to an egress port of the intermediate node associated with a second output path, different than the first output path, towards the second node;
  wherein the re-routing is performed locally in the intermediate node that detected the failure without involving the source node or second node; and
  wherein the received Ethernet frames include a Virtual Local Area Network (VLAN) tag, and the received Ethernet frames are sent out from the first node on the second output path without changing the VLAN tag.

13. A method for use at a first node of a network, the first node receiving on an input path and an associated ingress port, Ethernet frames originated by a source node and destined for a second node of the network, and forwarding on a first output path and an associated first egress port, the received Ethernet frames towards the second node, the method comprising the steps of:
  locally detecting by the first node, a failure along the first output path at a point between the first and second nodes; and
  internally re-routing by the first node, the received Ethernet frames along a second output path towards the second node, wherein the second output path is different than the first output path and is associated with a second egress port different than the first egress port, wherein the first and second egress ports are associated with different respective indications and the different respective indications are also applied to the Ethernet frames, the frames being offered to the first and second egress ports and only forwarded by a given one of the egress ports if there is a match between the indication associated with the given egress port and the indication applied to the offered frames, and wherein the frames are caused to be rerouted from the first path to the second path following the detection of the failure by changing the respective indications associated with the first and second egress ports;

wherein the frames are sent out from the first node on the second output path without changing the indications applied to the frames; and wherein the first and second output paths are not pre-provisioned in other network nodes, the second egress port is not the ingress port, and the first node does not send a message to the second node to notify the second node that the frames have been re-routed from the first path to the second path.

14. An apparatus for use at a first node of a network, the first node having an ingress port associated with an input path for receiving Ethernet frames originated by a source node and destined for a second node of the network, and having first and second egress ports associated with respective first and second different output paths for forwarding the received Ethernet frames towards the second node, the first and second egress ports being associated with different respective indications and the different respective indications also being applied to the Ethernet frames, and the first node being adapted such that frames are offered to the first and second egress ports and only forwarded by a given one of the egress ports if there is a match between the indication associated with the given output port and the indication applied to the offered frames, wherein the apparatus is configured to:
  locally detect a failure along the first output path at a point between the first and second nodes; and
  re-route the received Ethernet frames along the second output path towards the second node by changing the respective indications associated with the first and second egress ports;
  wherein the frames are sent out from the first node on the second output path without changing the indications applied to the frames; and
  wherein the first and second output paths are not pre-provisioned in other network nodes, the second egress port is not the ingress port, and the first node does not send a message to the second node to notify the second node that the frames have been re-routed from the first path to the second path.

15. A method for use at a first node of a network, the first node receiving on an input path and an associated ingress port, Ethernet frames originated by a source node and destined for a second node of the network, and forwarding on a first output path and an associated first egress port, the received Ethernet frames towards the second node, the method comprising the steps of:
  locally detecting by the first node, a failure along the first output path at a point between the first and second nodes;
  re-routing by the first node, the received Ethernet frames along a second output path, different than the first output path, towards the second node, wherein the second output path is associated with a second egress port different than the first egress port, wherein the first and second egress ports are associated with different respective Virtual Local Area Network (VLAN) tags, and the different respective VLAN tags are also applied to the Ethernet frames, the frames being offered to the first and second egress ports and only forwarded by a given one of the egress ports if there is a match between the VLAN tag associated with the given egress port and the VLAN tag applied to the offered frames, and wherein the frames are caused to be rerouted from the first path to the second path following the detection of the failure by changing the respective VLAN tags associated with the frames offered to the first and second egress ports, wherein the VLAN tags are changed by adding an outer header to the frames, an existing header becoming an inner header, and the outer header having a VLAN tag different than that in the inner header;

wherein the first and second output paths are not pre-provisioned in other network nodes, the second egress port is not the ingress port, and the first node does not send a message to the second node to notify the second node that the frames have been re-routed from the first path to the second path.

16. The method as claimed in claim 15, wherein the outer header comprises a destination address different than that in the inner header.

\* \* \* \* \*

UNITED STATES PATENT AND TRADEMARK OFFICE
CERTIFICATE OF CORRECTION

PATENT NO. : 8,411,688 B2
APPLICATION NO. : 12/933200
DATED : April 2, 2013
INVENTOR(S) : Farkas et al.

It is certified that error appears in the above-identified patent and that said Letters Patent is hereby corrected as shown below:

In the Specifications:

In Column 2, Line 5, delete "-ieff-" and insert -- -ietf- --, therefor.

In Column 4, Line 59, delete "tunnel" and insert -- tunnel. --, therefor.

In Column 6, Line 46, delete "S2" and insert -- S1 --, therefor.

In Column 6, Line 49, delete "S3" and insert -- S2 --, therefor.

In Column 10, in Table 5, under "Backup VLAN", Line 1, delete "00000000011" and insert -- 000000000011 --, therefor.

In Column 10, Line 23, delete "Ii" and insert -- is --, therefor.

In Column 10, in Table 6, under "Destination+VLAN", Line 1, delete "B + 1011010010001" and insert -- B + 101101001001 --, therefor.

In Column 10, in Table 6, under "Outer Header Dest.+VLAN", Line 1, delete "10111111111" and insert -- 101111111111 --, therefor.

In Column 10, in Table 6, under "Outer Header Dest.+VLAN", Line 2, delete "10111111111" and insert -- 101111111111 --, therefor.

In Column 11, in Table 6-continued, under "Outer Header Dest.+VLAN", Line 1, delete "10111111111" and insert -- 101111111111 --, therefor.

In Column 11, in Table 6-continued, under "Outer Header Dest.+VLAN", Line 2, delete "10111111111" and insert -- 101111111111 --, therefor.

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,411,688 B2

In Column 11, in Table 6-continued, under "Outer Header Dest.+VLAN", Line 3, delete "100000000001" and insert -- 101000000000 --, therefor.

In Column 11, in Table 6-continued, under "Outer Header Dest.+VLAN", Line 4, delete "100000000001" and insert -- 101000000000 --, therefor.

In Column 11, in Table 6-continued, under "Outer Header Dest.+VLAN", Line 5, delete "100000000001" and insert -- 101000000000 --, therefor.

In Column 11, in Table 6-continued, under "Outer Header Dest.+VLAN", Line 6, delete "100000000001" and insert -- 101000000000 --, therefor.

In Column 11, Line 35, in Table 8, delete "1011010010001" and insert -- 101111111111 --, therefor.